(12) United States Patent  (10) Patent No.: US 7,673,284 B2
Eichenberger et al.  (45) Date of Patent: *Mar. 2, 2010

(54) METHOD AND SYSTEM FOR VERSIONING CODES BASED ON RELATIVE ALIGNMENT FOR SINGLE INSTRUCTION MULTIPLE DATA UNITS

(75) Inventors: Alexandre E. Eichenberger, Chappaqua, NY (US); Amy (K. T.) Wang, North York (CA); Peng Wu, Mt. Kisco, NY (US); Peng Zhao, East York (CA)

(73) Assignee: International Business Machines Corporation, Armonk, NY (US)

( * ) Notice: Subject to any disclaimer, the term of this patent is extended or adjusted under 35 U.S.C. 154(b) by 1081 days.

This patent is subject to a terminal disclaimer.

(21) Appl. No.: 11/333,614

(22) Filed: Jan. 17, 2006

(65) Prior Publication Data

US 2007/0169058 A1 Jul. 19, 2007

(51) Int. Cl.
 *G06F 9/44* (2006.01)
 *G06F 9/45* (2006.01)
(52) U.S. Cl. .................. 717/106; 717/108; 717/110
(58) Field of Classification Search ......... 717/106–110, 717/122, 136, 140, 150
 See application file for complete search history.

(56) References Cited

U.S. PATENT DOCUMENTS

| 5,446,899 | A * | 8/1995 | Brett ......................... 717/145 |
| 5,551,040 | A * | 8/1996 | Blewett ...................... 717/106 |
| 6,748,588 | B1 * | 6/2004 | Fraser et al. ................. 717/146 |
| 6,941,545 | B1 * | 9/2005 | Reese et al. .................. 717/130 |
| 6,981,250 | B1 * | 12/2005 | Wiltamuth et al. .......... 717/170 |
| 7,110,936 | B2 * | 9/2006 | Hiew et al. ..................... 703/22 |
| 7,219,212 | B1 * | 5/2007 | Sanghavi et al. ............... 712/6 |
| 7,316,010 | B1 * | 1/2008 | Daynes et al. ............... 717/140 |
| 7,340,719 | B1 * | 3/2008 | Bakerman et al. ........... 717/106 |
| 7,376,812 | B1 * | 5/2008 | Sanghavi et al. ............. 712/24 |
| 7,386,842 | B2 * | 6/2008 | Eichenberger et al. ...... 717/150 |
| 7,392,505 | B2 * | 6/2008 | Ciapala et al. .............. 717/106 |
| 7,412,366 | B1 * | 8/2008 | Englehart et al. .............. 703/6 |
| 7,512,669 | B2 * | 3/2009 | Lo ............................. 709/217 |
| 2003/0204839 | A1 | 10/2003 | Kawahito et al. |
| 2003/0208749 | A1 | 11/2003 | Rajagopalan |

OTHER PUBLICATIONS

Madriles et al, "Boosting single thread perfromance in multi-core systems through fine grain multi threading", ACM ISCA, pp. 474-483, 2009.*

(Continued)

*Primary Examiner*—Anil Khatri
(74) *Attorney, Agent, or Firm*—Garg Law Firm, PLLC; Rakesh Garg; Libby Z. Handelsman (57) ABSTRACT

A method and system for generating efficient versioned codes for single instruction multiple data units whose memory systems have alignment constraints. The system creates multiple versions of codes based on relative alignments of the data streams involved in the computation. The system also analyzes characteristics of relative alignments (e.g. compile-time or runtime) to determine whether code versioning is beneficial based on a cost model.

14 Claims, 9 Drawing Sheets

OTHER PUBLICATIONS

Tian et al, "Copy or discard execuation model for speculative parallelization on multicores", IEEE, pp. 330-341, 2008.*
Ceze et al, "Bulk disambiguation of speculative threades in multi-processors", IEEE, pp. 1-12, 2006.*
Preuber et al, "Enabling constant time interface method dispatch in embadded java processors", ACM JTRES, 196-205, 2007.*
Naishlos; "Autovectorization in GCC", *GCC Developer's Submit*, 2004, pp. 105-118.

* cited by examiner

```
float a[N], b[N], c[N];
for (i=0; i<100; ++i)
{
    a[i+2+n] = b[i+1+n] +
              c[i+3+n];
}
```

Figure 1a

```
void foo (float* a, float* b, float* c) {
    for (i=0; i<100; ++i)
    {
        a[i] = b[i] + c[i];
    }
}
```

Figure 1b

```
float a[N], b[N], c[N];
for (i=0; i<100; ++i)
{
    a[i+n] = b[i+n] + c[i+n];
}
```

Figure 1c

```
float a[N], b[N], c[N];
for (i=0; i<100; ++i)
{
    a[i+2] = b[i+1] + c[i+3];
}
```

METHOD AND SYSTEM FOR VERSIONING CODES BASED ON RELATIVE ALIGNMENT FOR SINGLE INSTRUCTION MULTIPLE DATA UNITS

This invention was made with government support under National Security Agency Contract Number H98230-04-C-0920. THE GOVERNMENT HAS CERTAIN RIGHTS IN THIS INVENTION.

BACKGROUND OF THE INVENTION

1. Field of the Invention

The present invention relates generally to a data processing system and more specifically to a method, computer program product and system for generating versioned code with runtime alignment for single instruction multiple data units.

2. Description of the Related Art

Single Instruction Multiple Data (SIMD) units operating on packed, fixed-length vectors, such as AltiVec for IBM®, have become a popular addition to most general-purpose micro-processors. However, the difficulty of generating code (known as simdization) for such processors remains a hindrance to their wider acceptance.

The alignment constraint of SIMD memory units is a hardware feature that can significantly impact the effectiveness of simdization. For example, the memory operations in an AltiVec unit can only access 16-byte contiguous memory from 16-byte aligned addresses. In order to satisfy alignment constraints imposed by the hardware, the software/compiler must insert data reorganization codes to explicitly realign data during the simdization process. Additional alignment handling overhead may be added if alignments of some memory accesses in the codes are only known at runtime (referred to as runtime alignment). Embodiments of the present invention generate more efficient simdized codes in the presence of runtime alignment. To demonstrate the scenarios that can benefit from the present invention, consider the loop example in FIGS. 1A and 1B where the bases of arrays a, b, and c are aligned at 16-byte memory boundaries (illustrative examples of code being in the C programming language). For the loop in FIG. 1A, the base of arrays a, b, and c are 16-byte aligned, and n is a runtime value. Because of the unknown value n, accesses a[i+2+n], b[i+1+n], and c[i+3+n] (when i=0) have respectively a runtime alignment of (4n+8) mod 16, (4n+4) mod 16, and (4n+12) mod 16. Such loops are common in the internal representation of a compiler after loop normalization if the original loop has a lower bound of n. The modulus operator is denoted in some figures by the percent sign (%).

Figure 1A:
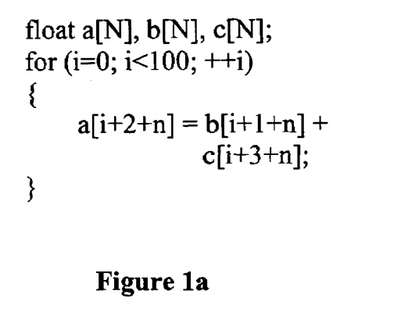
FIGS. 1A-1D are diagrams of pseudocode illustrating various types of loops which access a contiguous stream of memory with runtime or compile-time misalignment.
Figure 1B:
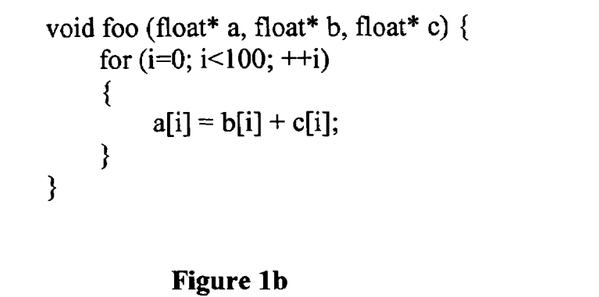

Similarly, for the loop in FIG. 1B, since a, b, c are pointers passed into a function, their alignments may not be known at compile-time.

One approach to speed up simdized loops with runtime alignment is the use of loop versioning. Code versioning is a well known technique that creates multiple specialization of a loop, each of which is guarded by different runtime conditions. These guard conditions decide, at the runtime, which version of the loop is to be executed.

The most common loop versioning technique for runtime alignment is to create a specialization of the loop when all runtime accesses are aligned as one version (A. Bik, M. Girkar, P. M. Grey, and X. Tian. Automatic Intra-Register Vectorization for the Intel Architecture. *International Journal of Parallel Programming*, (2):65-98, April 2002). Since this technique creates a version under the condition that all runtime alignments become alignment zero, we call this technique as "versioning for absolute alignment-zero". However, note that, in the above example, because of the relative difference between n, n+1, and n+2, the runtime conditions, (n mod 4)==0 && (n+1) mod 4==0 && (n+2) mod 4==0, can never be satisfied no matter what the value of n is.

Another technique is to construct a pre-loop that peels, at runtime, the original loop until all accesses in the loop reach the aligned boundary (S. Larsen, E. Witchel, and S. Amarasinghe. Increasing and Detecting Memory Address Congruence. In *Proceedings of 11th International Conference on Parallel Architectures and Compilation Techniques*, September 2002). In this case, the pre-loop will exit and enter a version of the loop where all accesses are aligned. In essence, it creates two versions of the loop: one is the pre-loop which is in the sequential mode; and the other is the simdized loop with all aligned accesses. The versioning condition is determined by the pre-loop exit condition.

This approach has two major drawbacks. First, the pre-loop contains runtime checks of the guarding condition inside the loop body, thus is very expensive. When the exit conditions are not satisfied at runtime, the sequential version will be much slower than the original sequential loop. Secondly, the exit-condition requires all accesses with runtime alignments to reach 16-byte aligned boundary at the same time. In the previous approach (versioning for absolute alignment-zero), even though the exit condition can never be satisfied, it still versions the loop.

SUMMARY OF THE INVENTION

The present invention provides a method, computer program product and system to generate efficient versioned codes for single instruction multiple data units whose memory systems have alignment constraints. The system creates multiple versions of codes based on relative alignments of the data streams involved in the computation. The system also analyzes characteristics of relative alignments (e.g., compile-time or runtime) to determine whether code versioning is beneficial based on a cost model.

Embodiments of the present invention are directed to a system, a method and a computer program product for generating code. One embodiment provides for a computer implemented method comprising inserting reorganization operations into a loop with misaligned accesses to satisfy alignment constraints; identifying stream shift operations with runtime relative alignments; versioning the loop based on the runtime relative alignment creating loop versions; and generating code for the loop versions.

In accordance with one aspect of the present invention, the loop is versioned using a guard condition that runtime relative alignment between pairs of misaligned references is a compile-time value.

In accordance with a second aspect of the invention, versioning the loop comprises determining in advance whether creating loop versions is worth proceeding using a pre-determined set of criteria of a cost model.

In one variation, the pre-determined set of criteria comprises at least one of the group of criterion consisting of performance benefit, probability of executing the faster version at runtime, and versioning overhead.

In another variation, the loop is versioned by removing shift stream operations from a faster version where runtime relative alignment between pairs of misaligned references corresponding to the shift stream operations is zero.

In a further variation, identifying stream shift operations corresponding to the loop body operation comprises generating a data reorganization graph from the loop.

In accordance with another aspect of the invention, reorganization operations are inserted applying a policy chosen from a group of policies comprising a zero shift policy, an eager shift policy, and a lazy shift policy.

BRIEF DESCRIPTION OF THE DRAWINGS

The novel features believed characteristic of the invention are set forth in the appended claims. The invention itself, however, as well as a preferred mode of use, will best be understood by reference to the following detailed description of an illustrative embodiment when read in conjunction with the accompanying drawings, wherein:

DETAILED DESCRIPTION OF THE PREFERRED EMBODIMENTS

The present invention provides a computer implemented method, system and computer program product that enables efficient versioning of codes based on their alignment characteristics.

A code versioning system creates multiple versions of the code, each of which is guarded by a specialization of certain runtime properties. The embodiments of the current invention are directed to versioning of loops based on a unique alignment property called "relative alignment".

Relative alignment defines the relative difference between the beginnings of two streams. For the purpose of this specification, a "stream" represents a sequence of contiguous memory locations that are accessed by a memory reference throughout the lifetime of a loop. For example, a static access a[i] in a loop (i=0, 100) represents a stream of data a[0], a[1], ... a[99]. By analogy, a stream is also a sequence of contiguous registers that are produced by an operation over the lifetime of a loop.

An important property of the stream is the "stream offset", which is defined as the byte offset of the first desired value in the first register of a stream. The memory alignment of an access dictates the offset of the stream produced by loading the access into registers. For example, assume that a is a 16-byte aligned integer array, the stream produced by, vload a[i+1] for i=0, 1, ..., 100, has an offset of 4-byte.

The offset difference of two streams involved in a computation (also known as relative alignment) is the key behind simdizing a computation with misaligned accesses. There are 2 components to satisfying alignment constraints in a valid simdization.

1. When simdizing a vector store operation (vstore), the byte offset of the data in the vector register must match the memory alignment of the store address. In other words, the offset of the register stream being stored must match the alignment of the store memory stream.
2. When simdizing a non-unary operation, data involved in the original computation must reside at the same byte offset in their respective vector registers. In other words, streams involved in the same SIMD operation must have matching offsets.

Figure 2A:
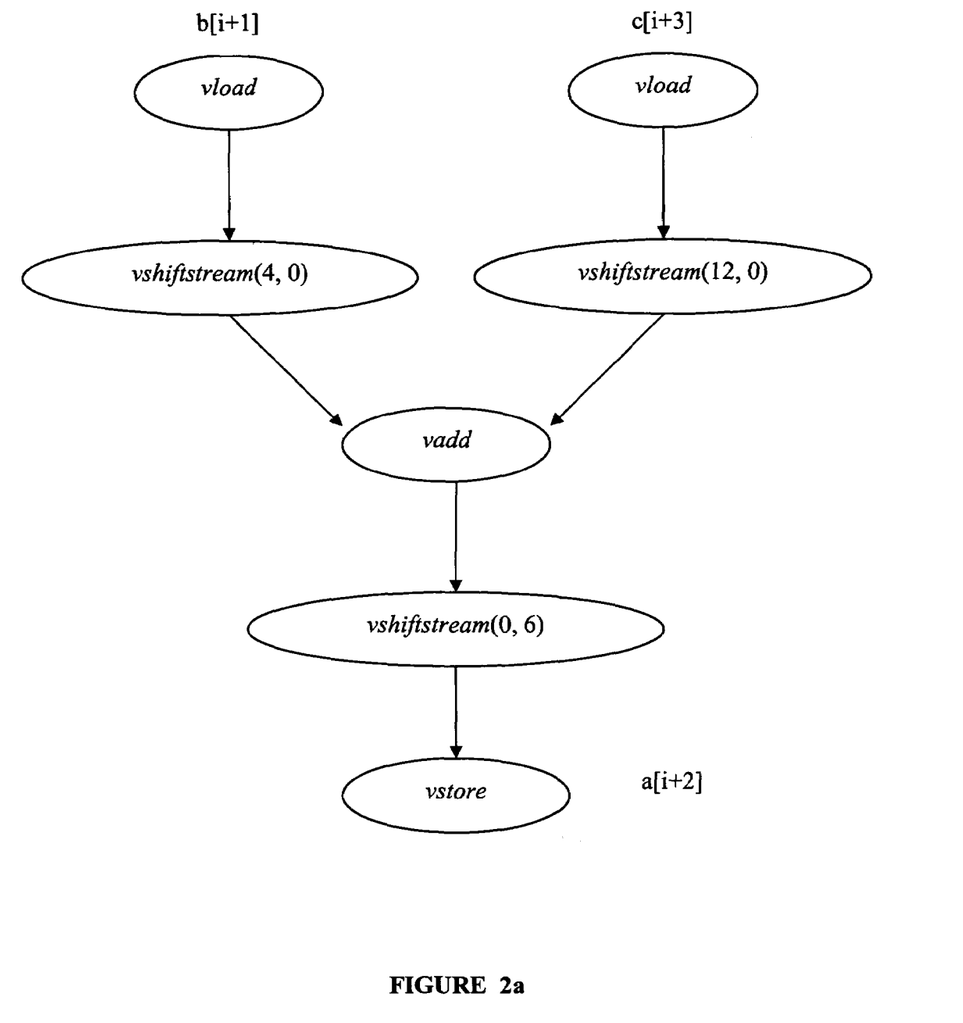
FIGS. 2A-2C depict expression trees (data reorganization graphs) representing a set of operations performed in simdized loop code using a zero-shift realignment policy, an eager-shift realignment policy, and a lazy-shift realignment policy.
Figure 2B:
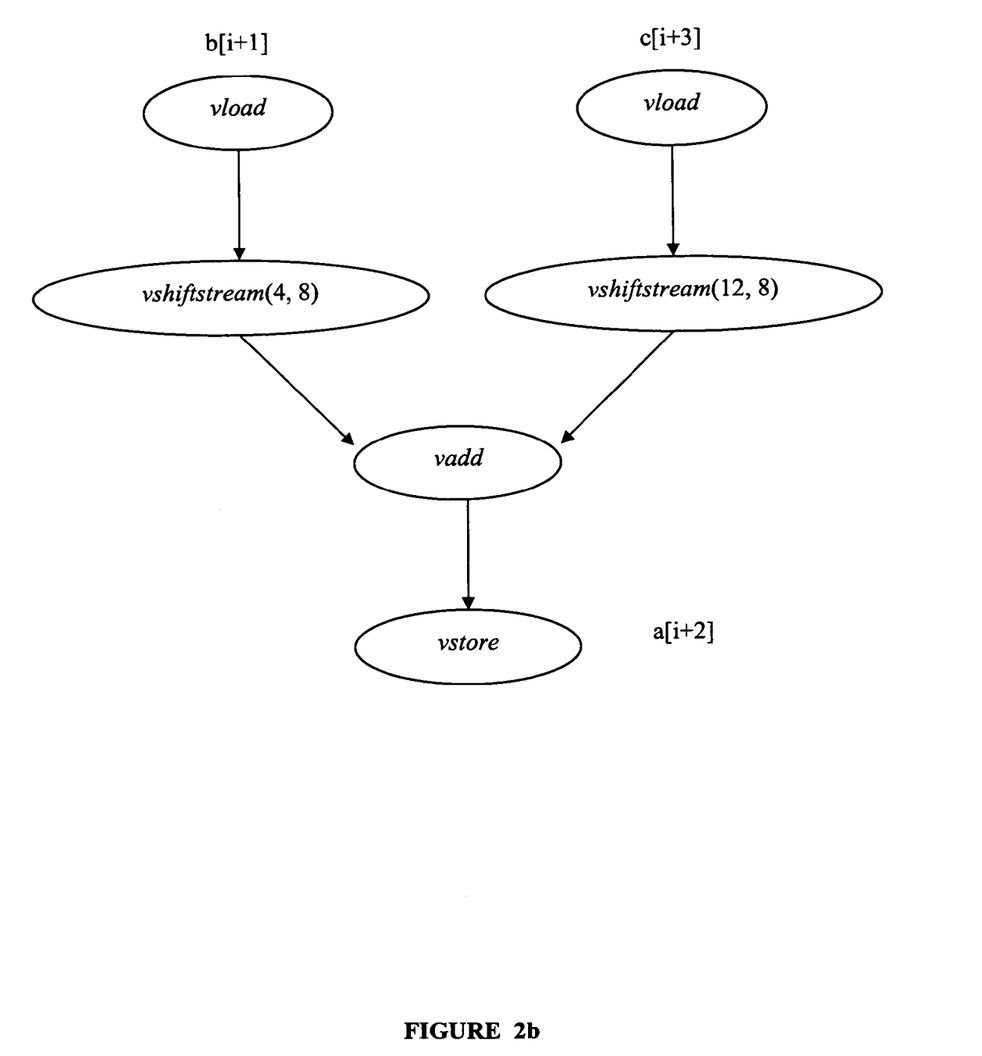
Figure 2C:
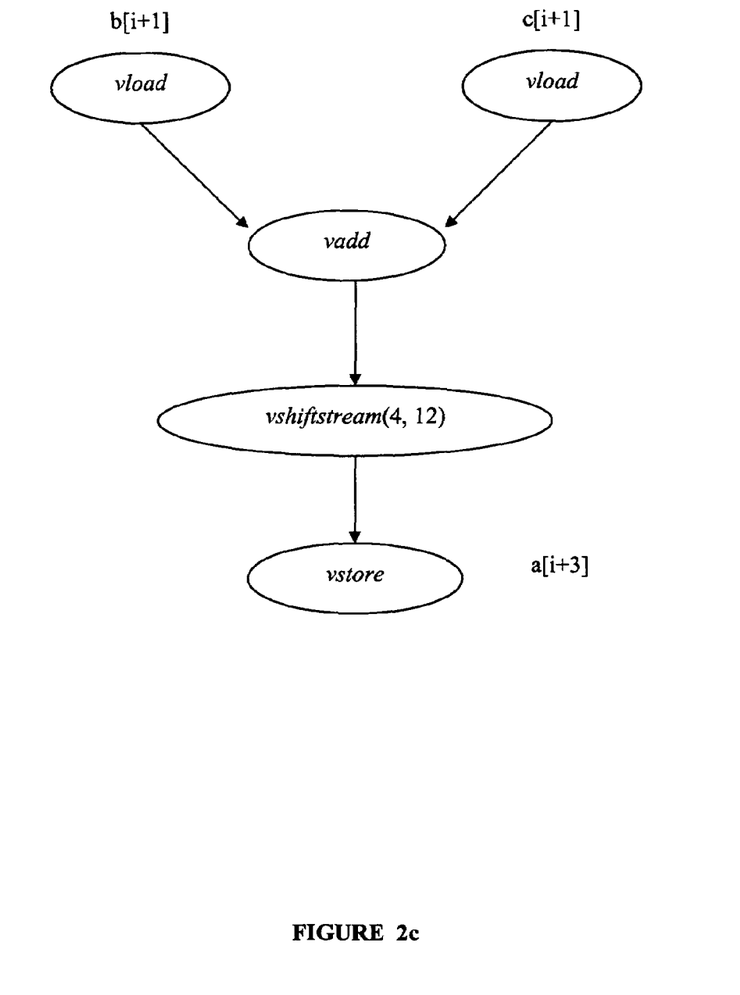

In the presence of misalignments, a valid simdization can only be achieved by judiciously inserting data reorganization operations to enforce the desired stream offsets, as indicated in FIGS. 2A, 2B, and 2C. A "stream shift" operation, denoted as vshiftstream(S, x, y), shifts all values of a register stream (S) with a first offset (x) across consecutive registers of the stream to a second offset (y). A vshiftstream operation is usually mapped to a permutation operation specific to the target platform in the simdized loop.

There are different ways of satisfying the alignment constraints mentioned above using stream shift operations. Three examples are shown in FIGS. 2A to 2C. This invention is not limited to using these three policies.

Figure 1C:
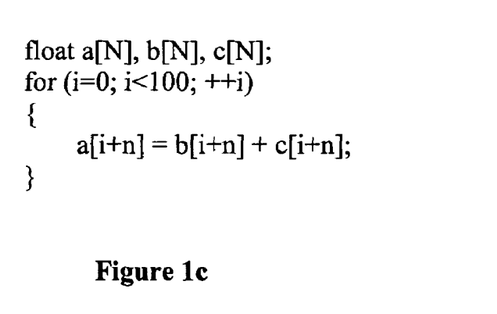
Figure 1D:
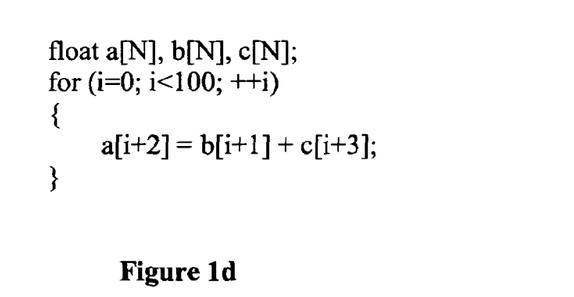

FIG. 2A shows what may be denoted as an example of "Zero-Shift Policy" for the body of the steady state loop after simdization (of FIG. 1D). This approach shifts each misaligned load stream to offset zero, and shifts the store stream from offset zero to the alignment of the store.

FIG. 2B shows what may be denoted as an example of "Eager-Shift Policy". This policy shifts each load stream directly to the alignment of the store (FIG. 1D).

Finally, FIG. 2C shows what may be denoted as an example of "Lazy-Shift Policy". This policy pushes the shift towards the root of the expression tree as close as possible. FIG. 2C shows its resulting simdization for a loop similar to that in FIG. 1D but where the loop body is a[i+3]=b[i+1]+c[i+1].

The number of vshiftstream operations inserted during simdization is a fairly precise indicator of data reorganization/permutation overhead introduced by alignment handling. For this reason, embodiments of this invention aim at specializing the number of vshiftstream operations involved in a simdized loop during versioning. Note that a stream shift operation, vshiftstream(S, x, y), becomes a nop (no operation) when x==y, thus can be safely eliminated. In this case, we say the two streams involved in the computation are relatively aligned.

In order to simplify discussion of exemplary aspects of the present invention, it as assumed hence that the SIMD architecture is 16-byte wide.

Embodiments of this invention are based on the fact that the relative alignment between different accesses in a loop determines the alignment handling overhead during the simdization. Consider the example in FIG. 1C, where a, b, and c are 16-byte aligned arrays.

Although accesses a[i+n], b[i+n], and c[i+n] in FIG. 1C have runtime alignment (because of the runtime value of n), they are relatively aligned with respective to each other. Thus, no data reorganization for the sake of alignment is necessary for this loop (save for a prologue and an epilogue loop to handle partial vector stores).

The versioning mechanism of embodiments of this invention uses x==y as guarding conditions for specialization so that some versions of the loop will have less (and possibly no) vshiftstream operations than others. Two streams are "relatively aligned" when they have the same offsets. Since the versioning is based on the equality of two stream offsets, this versioning scheme is denoted as "versioning based on relative alignment".

Specifically, given a simdized loop with vshiftstream operations inserted to satisfy the alignment constraints, the system versions the loop only if there is at least one vshiftstream with runtime relative alignments, and if so, versions the loop based on the condition that the relative runtime alignments are certain compile-time values, such as zero.

Figure 3:
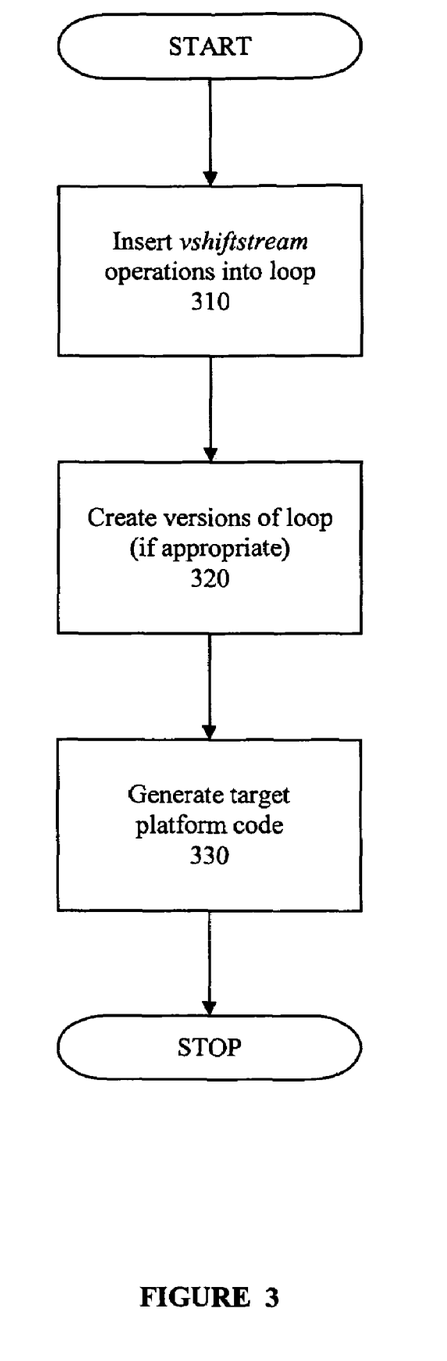
FIG. 3 is a flowchart representation of an exemplary process in accordance with a preferred embodiment of the present invention.

FIG. 3 is a flowchart representation of a process of simdizing a loop in accordance with one embodiment of the present invention. This process (framework) contains three stages. Firstly, during the data reorganization stage (block 310), the simdization constraints are satisfied by the approaches mentioned earlier, namely judicious insertion of vshiftstream operations into the loop. During the stage for versioning for relative alignment (block 320), versioning of the loop based on the stream offsets involved in vshiftstream operations is investigated and versions created if appropriate. Finally, the final stage maps SIMD operations into instructions of the target platform (block 330).

An exemplary approach of how the second stage of loop versioning proceeds is as follows. The compiler collects the vshiftstream operations inserted by the previous phase. Since stream offsets are computed from memory alignments, many vshiftstream operations come in the form of vshiftstream(S, x mod N, y mod N). In order to determine whether the offsets involved in a vshiftstream(S, x mod N, y mod N) operation can possibly be relatively aligned, we use the following sufficient and necessary condition:

$$(x \bmod N) == (y \bmod N) \mathit{iff} (x-y) \bmod N == 0 \quad (1)$$

Given a vshiftstream(S, x mod N, y mod N), if (x−y) mod N is a compile-time value, this is denoted as a "compile-time stream shift", and (x−y) mod N is a compile-time relative alignment. Otherwise, it is denoted as a "runtime stream shift", and (x−y) mod N is a runtime relative alignment.

In one embodiment, the versioning of the loop 320 is accomplished by steps as follows. Firstly, a determination is made whether versioning is unnecessary. A loop is a versioning candidate if there is at least one runtime stream shift in the loop. In other words, if all stream shifts in the loop are compile-time stream shift, no versioning is needed.

The next step assesses whether loop versioning is worth proceeding with. Any versioning scheme faces the challenge of trading off between potential performance benefit and versioning overhead. The following factors should be considered in a cost model. The actual cost model depends on what heuristic are chosen by a specific implementation.

The first factor is the performance benefit of the faster version versus the default version. For architectures that support arbitrary stream shifts, such as VMX and SPU, the performance difference between the faster version and the default version can be roughly estimated by the number of runtime stream shifts that can be versioned off. Some architectures, such as the dual FPU unit in BlueGene/L, do not support runtime stream shift (due to lack of general permutation instructions). For these architectures, the presence of runtime relative alignment prohibits simdization. Thus, the performance difference between the faster aversion and the default version is approximately the difference between simdized codes and scalar codes minus stream shift handling overhead. In addition to the direct overhead of additional data reorganization instructions, a loop that is free of any stream shifts produce codes with fewer dependencies on the critical path and with no prologue and epilogue codes compared with those with stream shifts. Furthermore, a loop that is free of any runtime stream shifts may produce cleaner prologue/epilogue codes than those with runtime stream shifts.

The second factor concerns the probability of executing the faster version at runtime. In general, the more terms are conjoined (ANDed) in the guarding condition, the less probable the condition will become fulfilled. Also, given (x−y) mod N, the smaller N is, the more probable the condition will become true. Using some simplification rules, N may be reduced. For example, (i*4−j*4) mod 16 can be simplified into [(i−j) mod 4]*4. Profiling information may predict the probability of some guarding conditions to be true.

The versioning process may collect a set of versioning conditions that may not be satisfied simultaneously. For example, n*4 mod 16==0 and (n−1)*4 mod 16==0 cannot be both true at the same time. In this case, the system can either decide to not version the loop (because the probability is zero of the guarding condition becoming true) or to remove one or more of the conflicting versioning conditions (and the runtime stream shift candidates associated with it).

The third factor is the versioning overhead. Since there is an additional branch per loop, the overhead depends on the computation involved in the loop and loop trip count. If the versioned loop is in a loop nest, then the one with invariant guarding conditions is less expensive than the one with variant guarding conditions.

In general, these three factors can be roughly combined as follows to form a single performance measure. Suppose that there are K runtime shifts in the loop, each (i) having a probability $P_i$ to be relatively aligned and an associated cost $C_i$. And suppose the sequential performance is S, and the simdized version without runtime shift has a performance of E. Where $V_o$ is the versioning overhead, the performance of a versioned loop can be estimated as:

$$P_1 * P_2 \ldots * P_k * E + (1 - P_1 * P_2 \ldots * P_k) * (E + C_1 + C_2 \ldots + C_k) + V_o \quad (2)$$

When the architecture supports runtime shifts, the performance of not versioning a loop is estimated as:

$$E + C_1 + C_2 \ldots + C_k \quad (3)$$

When the architecture does not support runtime shifts, the performance of not versioning a loop is estimated as the sequential performance S.

By trading off cost with benefit, a decision may be made whether to version a loop or not. The next step is to version the loop, determined to be a worthy candidate for versioning. The loop is versioned where the fast copy is guarded by the conditions that all (or a non-null subset) runtime stream shifts have a relative alignment of zero; and the corresponding stream shift nodes are removed from the body of this loop version. The default version will contain the original loop body.

Figure 4:
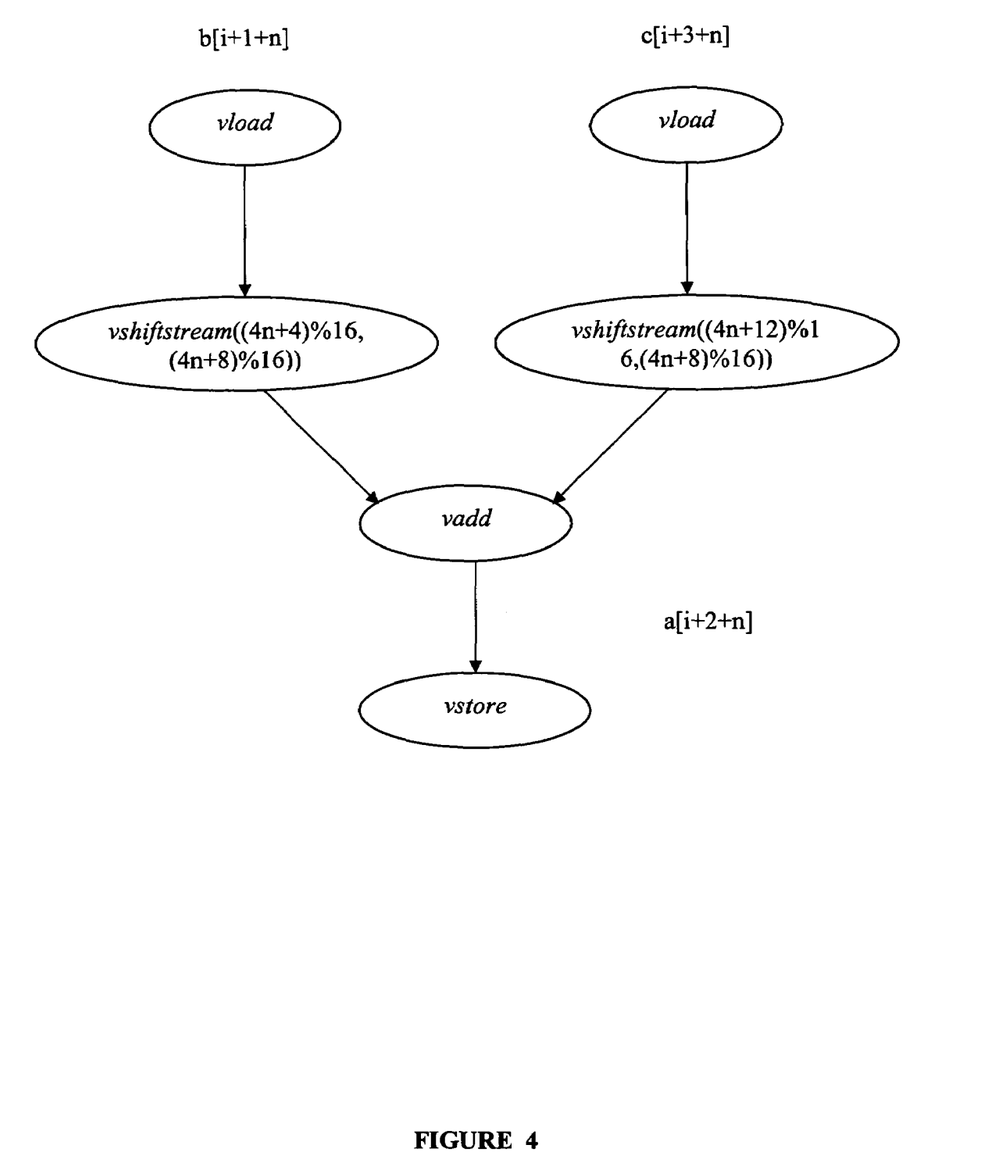
FIG. 4 depicts a data reorganization graph representing a set of operations performed in simdized loop code generated for the pseudocode shown in FIG. 1A using an eager-shift realignment policy.

Consider the loop in FIG. 1A where the base of arrays a, b, and c are 16-byte aligned. The expression tree for the steady-state loop after applying eager-shift policy is shown in FIG. 4. The modulus operation is denoted in the following figures by the percent sign (%). The versioning phase first collects all the vshiftstream nodes in the input expression tree. There are two stream shifts. Concerning vshiftstream((4n+4) mod 16, (4n+8) mod 16)), since (4n+4)−(4n+8) is a non-zero value (−4), the two offsets can not be relatively aligned, due to (1) above. Secondly, for vshiftstream((4n+12) mod 16, (4n+8) mod 16), since (4n+12)−(4n+8) is also a non-zero value, according to (1) again, the two stream offsets can not be relatively aligned.

Thus, according to step 1 of the versioning process, this loop is not a versioning candidate, thus it should not be versioned.

Figure 5:
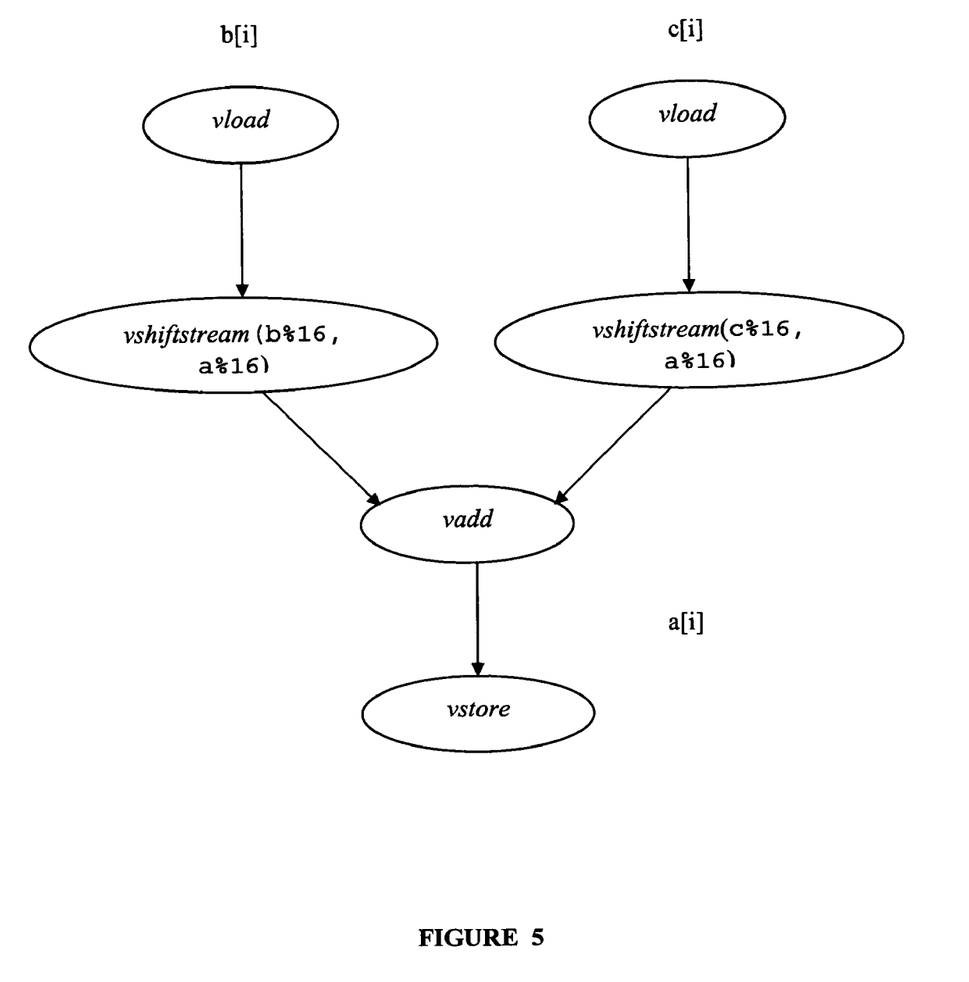
FIG. 5 depicts a data reorganization graph representing a set of operations performed in simdized loop code generated for the pseudocode shown in FIG. 1B using an eager-shift realignment policy.

Consider a second example corresponding to the loop in FIG. 1B, where a, b, c are pointers passed to a function whose alignments are not known at compile-time. The expression tree for the simdized loop after applying eager-shift policy is given in FIG. 5. There are two stream shifts in the loop. Concerning vshiftstream(b mod 16, a mod 16), since (b−a) is a runtime value, the two offsets may be relatively aligned. Similarly for vshiftstream(c mod 16, a mod 16), since (c−a) is a runtime value, the two offsets may be relatively aligned.

Figure 6:
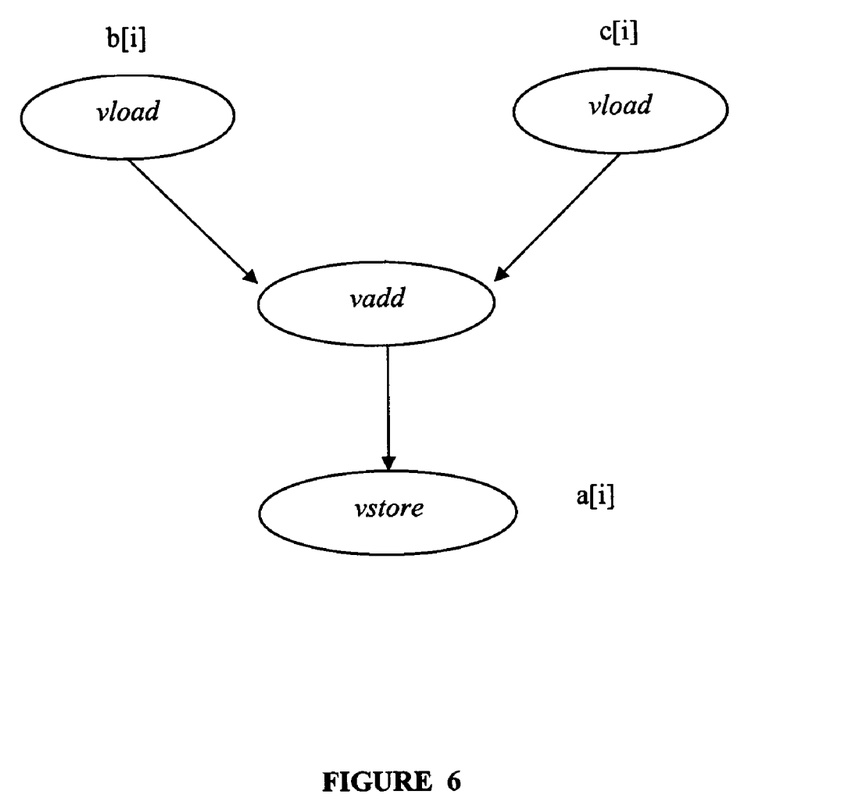
FIG. 6 depicts a data reorganization graph representing a set of operations performed in a fast version of the versioned simdized loop code generated for the pseudocode shown in FIG. 5.

Since all stream shifts have runtime relative alignment, the loop is appropriate to be versioned. The default version (original) has the expression tree shown in FIG. 5. The expression tree of the faster version of the loop is shown in FIG. 6. Note that, this faster version of the loop is guarded by condition ((b−a) mod 16==0 && (c−a) mod 16==0), and the loop body contains no vshiftstream nodes meaning that there is no data reorganization overhead.

Although the above examples refer to unit-stride memory access, a person skilled in the art will understand that non-unit-stride memory accesses are within the scope of this invention. Similarly, a loop may contain several loop body statements, each rendering the loop amenable to versioning in accordance with the steps of the invention outlined above and using versioning techniques known in the art.

Figure 7:
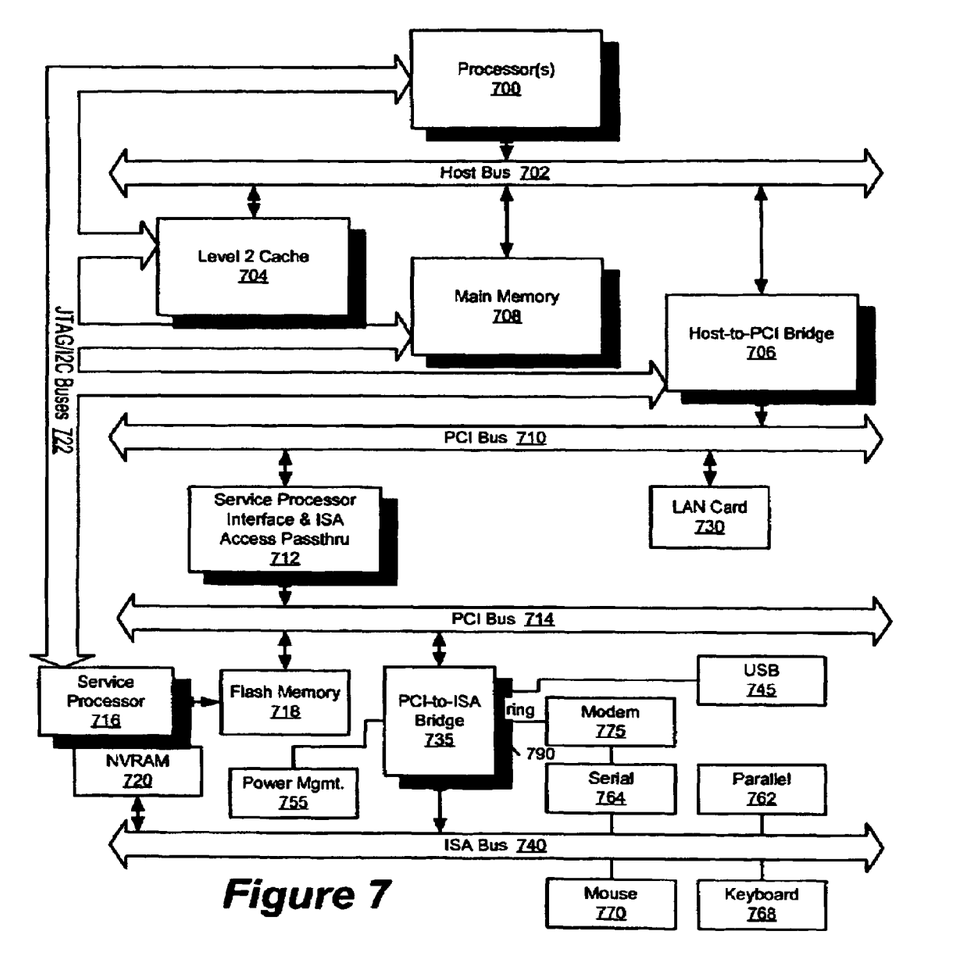
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provide an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C buses 722 for communication with processor(s) 700 during initialization steps. JTAG/I2C buses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system, 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method for generating versioned codes usable in a single instruction multiple data processor unit that uses a memory system having an alignment constraint, comprising:

inserting reorganization operations into a code in a computer memory, the code representing a loop with misaligned accesses to satisfy alignment constraints, the reorganization operations operating to enforce a stream offset;

identifying in the loop stream shift operations with runtime relative alignments wherein a stream shift operation is an operation that shifts all values of a register stream with a first offset across consecutive registers of the register stream to a second offset;

versioning the loop based on the runtime relative alignment creating loop versions, wherein the loop is versioned using a guard condition that runtime relative alignment between pairs of misaligned references is a compile-time value, and wherein the loop is versioned by removing shift stream operations from a faster version where runtime relative alignment between pairs of misaligned references corresponding to the shift stream operations is zero; and generating code for the loop versions, the code for loop versions upon executing in the single instruction multiple data processor unit that uses the memory system having the alignment constraint, manipulating data in the memory system.

2. The computer implemented method of claim 1, wherein versioning the loop comprises determining in advance whether creating loop versions is worth proceeding using a pre-determined set of criteria of a cost model.

3. The computer implemented method of claim 2, wherein the pre-determined set of criteria comprises at least one of the group of criterion consisting of performance benefit, probability of executing the faster version at runtime, and versioning overhead.

4. The computer implemented method of claim 1, wherein identifying stream shift operations corresponding to the loop body operation comprises generating a data reorganization graph from the loop.

5. The computer implemented method of claim 1, wherein reorganization operations are inserted applying a shift policy chosen from a group of policies comprising a zero shift policy, an eager shift policy, and a lazy shift policy.

6. A computer program product, comprising a computer readable medium including computer readable instructions, for generating versioned codes usable in a single instruction multiple data processor unit that uses a memory system having an alignment constraint, the computer readable instructions comprising computer readable instructions for:

inserting reorganization operations into a code in a computer memory, the code representing a loop with misaligned accesses to satisfy alignment constraints, the reorganization operations operating to enforce a stream offset;

identifying in the loop stream shift operations with runtime relative alignments wherein a stream shift operation is an operation that shifts all values of a register stream with a first offset across consecutive registers of the register stream to a second offset;

versioning the loop based on the runtime relative alignment creating loop versions, wherein the loop is versioned using a guard condition that runtime relative alignment between pairs of misaligned references is a compile-time value, and wherein the loop is versioned by removing shift stream operations from a faster version where runtime relative alignment between pairs of misaligned references corresponding to the shift stream operations is zero; and generating code for the loop versions, the code for loop versions upon executing in the single instruction multiple data processor unit that uses the memory system having the alignment constraint, manipulating data in the memory system.

7. The computer program product of claim 6, wherein versioning the loop comprises determining in advance whether creating loop versions is worth proceeding with using a pre-determined set of criteria of a cost model.

8. The computer program product of claim 7, wherein the pre-determined set of criteria comprises at least one of the group of criterion consisting of performance benefit, probability of executing the faster version at runtime, and versioning overhead.

9. The computer program product of claim 6, wherein identifying stream shift operations corresponding to the loop body operation comprises generating a data reorganization graph from the loop.

10. The computer program product of claim 6, wherein reorganization operations are inserted applying a policy being one of a zero shift policy, an eager shift policy, and a lazy shift policy.

11. A system for generating code executable on a single instruction multiple data processor unit, the single instruction multiple data processor unit configured to use a memory system having an alignment constraint, the system comprising:

a storage device including a storage medium, wherein the storage device stores computer usable program code; and a processor, wherein the processor executes the computer usable program code, and wherein the computer usable program code comprises:

computer usable code for inserting reorganization operations into a code in a computer memory, the code representing a loop with misaligned accesses to satisfy alignment constraints, the reorganization operations operating to enforce a stream offset;

computer usable code for identifying in the loop stream shift operations with runtime relative alignments, wherein a stream shift operation is an operation that shifts all values of a register stream with a first offset across consecutive registers of the register stream to a second offset;

computer usable code for versioning the loop based on the runtime relative alignment creating loop versions, wherein the loop is versioned using a guard condition that runtime relative alignment between pairs of misaligned references is a compile-time value, and wherein the loop is versioned by removing shift stream operations from a faster version where runtime relative alignment between pairs of misaligned references corresponding to the shift stream operations is zero; and computer usable code for generating code for the loop versions, the code for loop versions upon executing in the single instruction multiple data processor unit that uses the memory system having the alignment constraint, manipulating data in the memory system.

12. The system of claim 11, wherein the computer usable code for versioning the loop comprises computer usable code for determining in advance whether creating loop versions is worth proceeding with using a pre-determined set of criteria of a cost model.

13. The system of claim 12, wherein the pre-determined set of criteria comprises at least one of the group of criterion consisting of performance benefit, probability of executing the faster version at runtime, and versioning overhead.

14. The system of claim 11, wherein the computer usable code for identifying stream shift operations corresponding to the loop body operation comprises computer usable code for generating a data reorganization graph from the loop.

* * * * *